May 16, 1950

W. C. ASLESEN 2,507,492

APPARATUS FOR TREATING PEAT

Filed Sept. 2, 1947

INVENTOR
WILLIAM C. ASLESEN
By Chas. C. Reif.
Attorney

May 16, 1950 W. C. ASLESEN 2,507,492
APPARATUS FOR TREATING PEAT
Filed Sept. 2, 1947 2 Sheets-Sheet 2
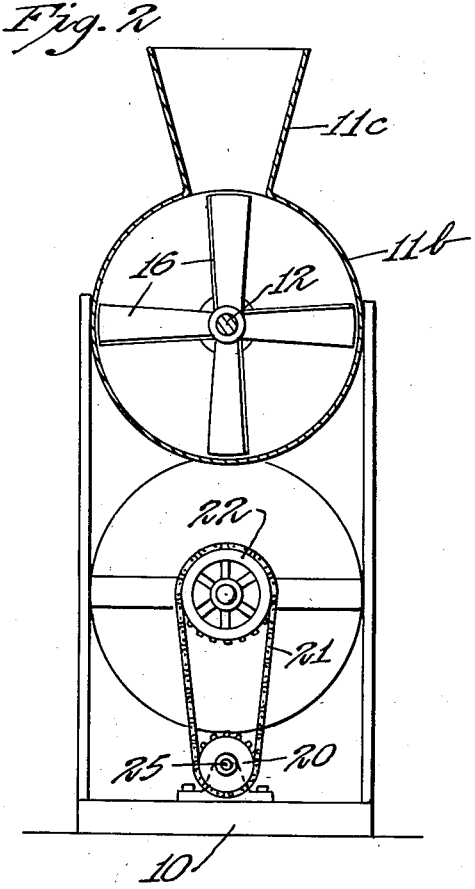
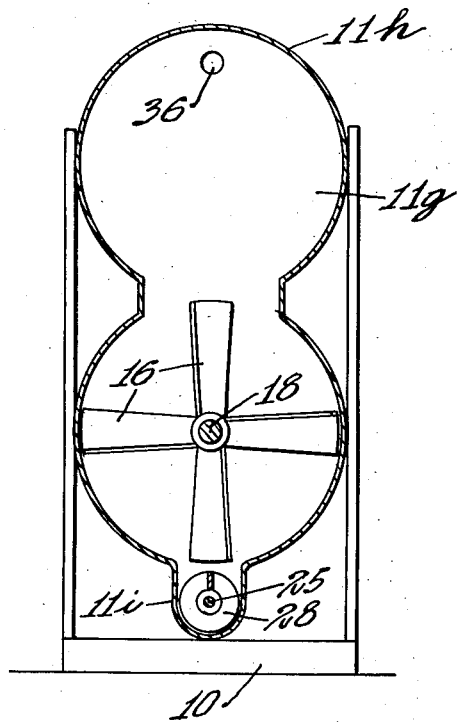
INVENTOR
WILLIAM C. ASLESEN
By Chas. C. Reif.
Attorney

UNITED STATES PATENT OFFICE 2,507,492

APPARATUS FOR TREATING PEAT

William C. Aslesen, Minneapolis, Minn.

Application September 2, 1947, Serial No. 771,805

1 Claim. (Cl. 44—27)

This invention relates to a method and apparatus for handling or treating peat. Peat occurs in large deposits in certain parts of the United States, particularly in the Northwestern States. While raw peat is combustible, the same contains a great deal of moisture and does not make in its raw state a practical fuel. With the present high price of coal, peat now has great potentialities as a fuel if it can be properly and cheaply prepared.

It is an object of this invention to provide a method and apparatus by which raw peat can be treated so as to make a satisfactory fuel at a very reasonable expense.

It is a further object of the invention to provide an apparatus in which the peat is reduced or broken up together with the cells thereof, the moisture largely removed and the peat compacted.

It is also an object of the invention to provide a method by which peat can be reduced or broken up, together with the cells thereof, in a continuous process in the presence of a partial vacuum.

It is another object of the invention to provide an apparatus for treating peat comprising a chamber having means for reducing the peat and forcing the same through a restricted opening into a second chamber so that said opening is sealed, means in said second chamber for further reducing said peat and forcing the same through a discharge opening so that said latter opening is sealed, together with means for exhausting air from said second chamber so that due to said sealed openings a partial vacuum can be maintained in said second chamber.

It is still another object of the invention to provide an apparatus for reducing, dehydrating and compacting peat in which said peat is discharged through an opening having a shaft or similar member disposed centrally in said opening so that said peat is extruded through said opening around said shaft and thus has a passage extending therethrough.

These and other object and advantages of the invention will be fully set forth in the following description made in connection with the accompanying drawings in which like reference characters refer to similar parts throughout the several views and in which:

Fig. 2 is a vertical section taken substantially on line 2—2 of Fig. 1, as indicated by the arrows; and Fig. 3 is a vertical section taken substantially on line 3—3 of Fig. 1, as indicated by the arrows.

Figure 1:
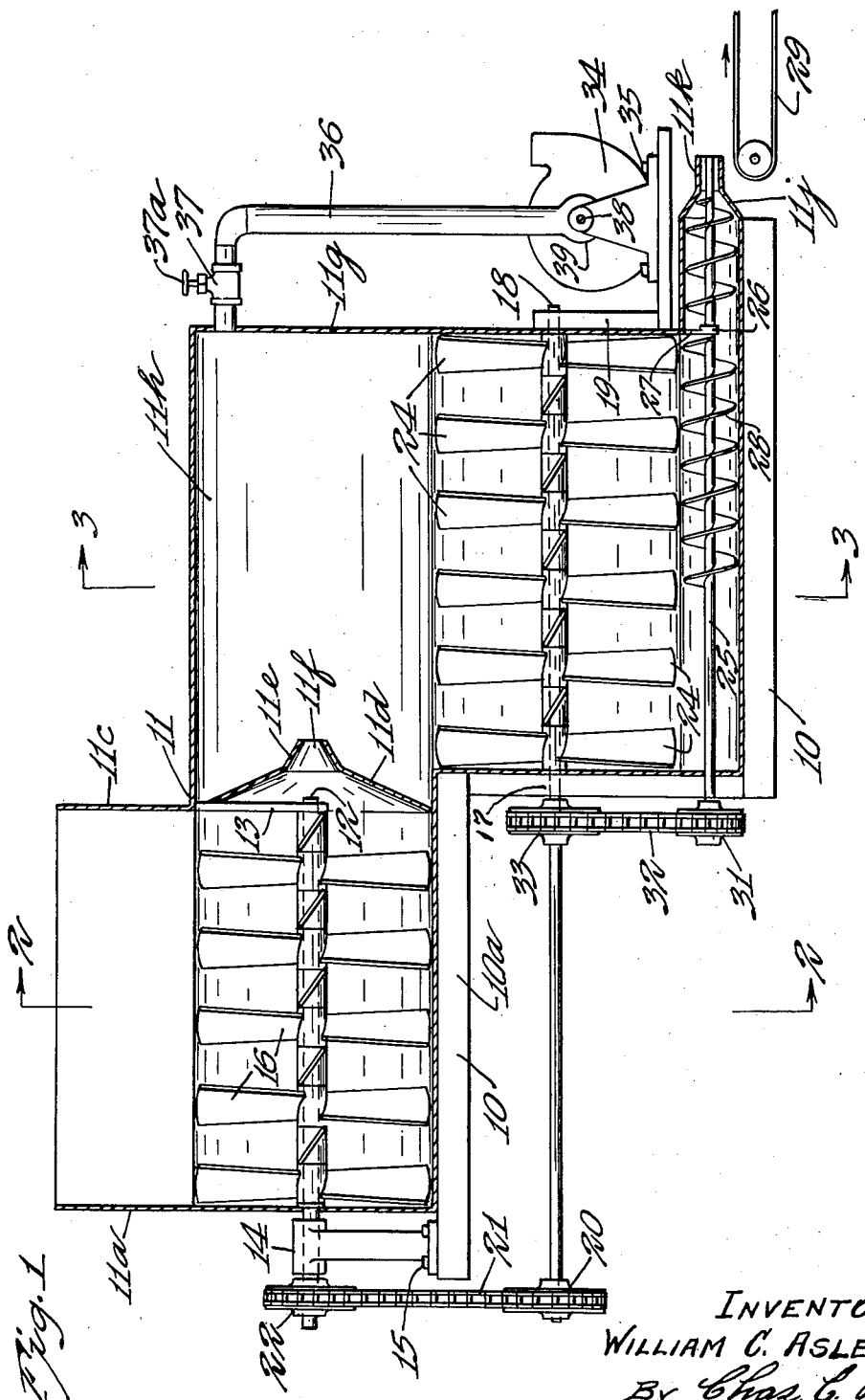
Fig. 1 is a view mostly in central vertical section and partly in side elevation illustrating the apparatus of this invention.

Referring to the drawings, an apparatus comprising a frame 10 is shown. Supported on frame 10 is a casing 11. Frame 10 has an upper portion 10a on which is supported an upper portion 11a of the casing, said portion 11a comprising a lower semi-cylindrical portion 11b and an upper portion 11c. As shown in Figs. 1 and 2, portion 11c has sides flaring upwardly and is open at its bottom. Extending axially through a portion 11b is a shaft 12 which is supported at its ends in bearings 13 and 14 respectively. Bearing 13 will be secured to the walls of casing 11 and bearing 14 is in the form of a bracket having a base flange secured to portion 10a by bolts 15. Secured to shaft 12 is a series of circumferentially spaced blades 16. Blades 16 have hubs secured to shaft 12 and said blades are helically arranged on shaft 12 and are disposed at an angle so that in the rotation of shaft 12 they tend to move the material in portion 11b toward the right, as seen in Fig. 1. Shaft 12 will be driven from some suitable source of power, such as a suitable motor not shown. Portion 11b has a discharge end comprising a frustoconical portion 11d which extends to a smaller frustoconical portion 11e having a central discharge opening 11f. Casing 11 comprises a second portion 11g having a chamber 11h therein. Chamber 11h receives material discharged through opening 11f. The upper part of portion 11g is semi-circular, as shown in Fig. 3, as is also the lower portion thereof. Said upper and lower parts of portion 11g are connected by vertical parallel walls of short extent. Said upper portion is open or constitutes a rather large space. Below the lower part of portion 11g is a semi-cylindrical trough 11i having vertical side walls which merge into the walls of the lower part of portion 11g. Extending through the lower part of portion 11g and through the lower part of chamber 11h below said upper portion or space and coaxially of said lower part is a shaft 18. Shaft 18 is supported at its ends in bearings 19 and 17 respectively forming part of frame 10. Shaft 18 is extended beyond portion 11g and has secured thereto adjacent one end a sprocket 20. A chain 21 runs over sprocket 20 and over sprocket 22 secured to shaft 12. Shaft 18 can thus be driven from shaft 12. Within the lower part of chamber 11g, shaft 18 has secured thereto a series of blades 24 having hubs secured to shaft 18. Blades 24 are arranged in circumferentially spaced relation and will be arranged helically on shaft 18 and disposed at an angle so that in the rotation of shaft 18 said blades will have a tendency to move material to the right, as seen in Fig. 1. A shaft 25 extends longitudinally through trough 11i substantially coaxial with the semi-cylindrical portion thereof. Shaft 25 is supported in a bearing formed in frame 10 and is supported in another bearing 26 supported by a rod 27a depending from a portion of the casing portion 11g. Shaft 25 has secured thereto a helical or screw conveyor 28 which extends throughout the major portion of trough 11i. Trough 11i has a cylindrical portion extending some distance beyond the end wall of casing portion 11g. This cylindrical portion of trough 11i has a frustoconical discharge portion 11j from which extends a cylindrical portion 11k having an open discharge end. The end of shaft 25 is somewhat reduced and is disposed axially of portions 11j and 11k. An endless conveyor 29 of the belt type has its end portion disposed below the discharge end of portion 11k. Shaft 25 extends beyond casing 11 and has secured thereto a sprocket 31 over which runs a chain 32 also running over a sprocket 33 secured to shaft 18. Shaft 25 can thus be driven through chain 32 from shaft 18. A fan or blower 34 is supported upon a portion of frame 10 and is shown as secured thereto by bolts 35. The intake end of blower 34 is connected by a conduit 36 to the upper portion of chamber 11g. A valve 37, preferably of the gate type, is disposed in the upper horizontal portion of conduit 36. Valve 37 is provided with the usual operating handle or hand wheel 37a. Blower 34 has secured to the shaft 38 thereof a pulley 39 which will be driven by a suitable belt from a convenient motor.

In carrying out the method of the invention in the apparatus above described, the raw peat is delivered into upper portion 11c and drops into the portion 11b. Shaft 12 and blades 16 will be rotated and the peat will be reduced or broken up so that the cells thereof are broken. After the peat has thus been operated upon by the blades or beaters 16, the same is moved to the right-hand end of portion 11b, as seen in Fig. 1, and is forced through the portion 11e and through opening 11f. The opening 11f is substantially closed by the peat passing therethrough so that said opening is substantially sealed against passage of air. The peat passing through opening 11g drops to the lower part of chamber 11g where it again is reduced and further broken up and the cells thereof broken by the blades or beaters 24. The peat is moved to the right, as seen in Fig. 1, and the same drops down into trough 11i and as shaft 25 and conveyor 28 are being rotated the peat which is now well reduced and broken up is moved to the right in trough 11i, as shown in Fig. 1, and is forced through portion 11k and through the discharge opening thereof. The peat which thus is extruded through portion 11k in a very compacted form drops onto conveyor 29 and is carried thereon to a suitable and desired point. Conveyor 29 moves in a direction indicated by the arrow in Fig. 1. Since shaft 25 is disposed centrally of portion 11k, the peat being extruded passes around said shaft and a hole or passage is formed in the discharged peat. The peat is thus formed into a stick having a central passage therein. In practice this stick has been about six inches in diameter. While the peat is being acted upon in chamber 11g, blower 34 is operated and air is constantly withdrawn from chamber 11g so that a partial vacuum is maintained therein. The degree of vacuum can be regulated by adjustment of valve 37 and by variation in the speed of blower 34. It is desirable that the chamber 11g be sealed against the entrance of air and the restricted openings 11f and that in portion 11k are sealed by the peat moving therethrough. With this provision of sealing said openings a continuous process can be carried on. This is a great advantage and makes a really practical and commercial process. In the patent to Hindshaw, No. 1,334,492, granted March 23, 1920, an attempt was made to withdraw air from the compressed peat in a partial vacuum but no operative means were provided to seal the chamber from which the air was withdrawn. The same was true in the apparatus shown in the Patent No. 1,486,141 granted March 11, 1924. With the feeding member 4 disclosed therein it was impossible to maintain a vacuum in chamber 2. Applicant by first breaking up and reducing the peat in portion 11b brings the peat into finely divided condition and converts the same into a moist semi-fluid mass which can be forced through the restricted opening 11f so as to keep said opening sealed. The peat in the cylindrical end of trough 11i and that passing through the portion 11k also effectively seals the discharge opening through portion 11k. Moisture and air can thus be continuously drawn off of the peat being treated in chamber 11h. Heat can be applied to chamber 11 if desired.

Peat in its natural state as dug from the ground consists of a spongy moist mass. The structure of the peat comprises a plurality of elongated cells. It is necessary to break up these cells or a great majority of them if the moisture and air contained in the peat is to be effectively removed. After being treated by applicant's method and apparatus a large proportion of the moisture and the air in the peat cells has been removed. The moisture and air are further pressed out by being forced through the restricted openings and the peat discharged through portion 11k is in very compacted form. This large stick of treated peat which looks very much like a large stick of licorice is placed on racks and soon dries into a hard form. The peat so dried will not again absorb moisture. The pectin contained in the raw peat is supposed to be changed to anhydrous pectose. Even though the dried peat is kept submerged in water it will not again absorb any appreciable amount of moisture. The dried stick of peat can be formed into convenient lengths and makes a very desirable fuel. Practically all of the air, gases and moisture in the peat cells, as above stated, have been removed. The peat therefore has not enough remaining water to render it objectionable as a fuel. Peat contains considerable oxygen and the oxygen combined therein aids combustion. The dried peat burns with practically no ash.

From the above description it will be seen that I have provided a much improved and very practical method and apparatus for reducing, dehydrating and compacting peat. The method and apparatus have been demonstrated in actual practice and found to be very successful and efficient.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claim.

What is claimed is:

A peat-treating apparatus having in combination, a chamber to which raw peat is delivered, a rotatable shaft in said casing, blades on said shaft arranged in circumferentially spaced helical relation for breaking up said peat and the cells thereof and advancing said peat in said chamber, said chamber having a discharge passage spaced from one end of said shaft and blades and coaxial with said shaft, said discharge passage comprising a restricted passage having walls converging to its discharge end through which said peat is forced by said blades so that said peat seals said passage and opening, a second enclosed chamber to which said peat is delivered through said passage, said second chamber having a large unobstructed upper portion, rotating means in the lower portion of said second chamber for further breaking up said peat and the cells thereof and advancing said peat, and a discharge passage adjacent the bottom of said second chamber having a restricted outlet opening, said peat being forced through said last mentioned passage and sealing said last mentioned passage, and means for withdrawing air from said upper portion of said second chamber whereby a partial vacuum can be maintained thereon.

WILLIAM C. ASLESEN.

REFERENCES CITED

The following references are of record in the file of this patent:

UNITED STATES PATENTS

| Number | Name | Date |
| --- | --- | --- |
| 506,151 | Blunden | Oct. 3, 1893 |
| 1,334,492 | Hindshaw | Mar. 23, 1920 |
| 1,987,359 | Brown | Jan. 8, 1935 |

FOREIGN PATENTS

| Number | Country | Date |
| --- | --- | --- |
| 664,650 | Germany | Sept. 15, 1938 |